(12) United States Patent
Wu et al.

(10) Patent No.: US 12,141,203 B2
(45) Date of Patent: Nov. 12, 2024

(54) TENANT BASED PERMISSION ALLOCATION FOR A GRAPH DATABASE

(71) Applicant: GraphSQL, Inc., Redwood City, CA (US)

(72) Inventors: Mingxi Wu, Redwood City, CA (US); Zixuan Zhuang, Redwood City, CA (US); Yu Xu, Millbrae, CA (US); Dan Hu, Redwood City, CA (US); Chengjie Qin, Sunnyvale, CA (US)

(73) Assignee: GraphSQL, Inc., Redwood City, CA (US)

( * ) Notice: Subject to any disclaimer, the term of this patent is extended or adjusted under 35 U.S.C. 154(b) by 0 days.

(21) Appl. No.: 17/671,705

(22) Filed: Feb. 15, 2022

(65) Prior Publication Data

US 2022/0171870 A1 Jun. 2, 2022

Related U.S. Application Data

(63) Continuation of application No. 16/007,778, filed on Jun. 13, 2018, now Pat. No. 11,250,148.

(51) Int. Cl.
| | | |
|---|---|---|
| *G06F 16/00* | (2019.01) | |
| *G06F 16/901* | (2019.01) | |
| *G06F 21/62* | (2013.01) | |
| *G06F 9/46* | (2006.01) | |
| *G06F 12/14* | (2006.01) | |

(52) U.S. Cl.
CPC ...... *G06F 16/9024* (2019.01); *G06F 21/6218* (2013.01); *G06F 9/468* (2013.01); *G06F 12/1458* (2013.01); *G06F 21/62* (2013.01); *G06F 2221/2113* (2013.01); *G06F 2221/2141* (2013.01); *G06F 2221/2145* (2013.01)

(58) Field of Classification Search
CPC .. G06F 16/9024; G06F 9/468; G06F 12/1458; G06F 21/604; G06F 21/62; G06F 21/6218; G06F 2221/2113; G06F 2221/2141; G06F 2221/2145
See application file for complete search history.

(56) References Cited

U.S. PATENT DOCUMENTS

| | | | |
|---|---|---|---|
| 10,432,639 B1* | 10/2019 | Bebee | G06F 16/90335 |
| 2010/0306393 A1* | 12/2010 | Appiah | G06Q 10/10 |
| | | | 709/229 |
| 2014/0129936 A1* | 5/2014 | Richards | G06F 16/248 |
| | | | 715/716 |
| 2017/0262653 A1* | 9/2017 | Dang | G06F 16/9537 |
| 2017/0272443 A1* | 9/2017 | Haila | G06F 21/6227 |
| 2018/0239959 A1 | 8/2018 | Bui et al. | |
| 2018/0247073 A1* | 8/2018 | Kreutzer | G06F 16/9024 |

(Continued)

*Primary Examiner* — Diedra McQuitery

(57) ABSTRACT

Systems, methods, and software described herein provide enhancements for managing permissions in a shared graph. In one implementation, a graph management system identifies a request to classify a first subgraph in the graph for access by a tenant of a plurality of tenants, wherein the request indicates one or more vertex types and/or one or more edge types for the first subgraph. The graph management system further identifies one or more vertices and/or one or more edges in the graph that qualify for the first subgraph based on the indicated one or more vertex types and/or one or more edge types, and allocates permissions to at least one user associated with the tenant to access the first subgraph.

20 Claims, 8 Drawing Sheets

(56) References Cited

U.S. PATENT DOCUMENTS

2019/0251272 A1\* 8/2019 Ravizza .............. G06F 21/6227
2019/0294733 A1 9/2019 Scheideler et al.
2019/0318113 A1 10/2019 Cortes Rossello et al.
2019/0327271 A1\* 10/2019 Saxena .................. H04L 41/16

\* cited by examiner

TENANT BASED PERMISSION ALLOCATION FOR A GRAPH DATABASE

RELATED APPLICATIONS

This application is a continuation of, related to and claims priority to U.S. patent application Ser. No. 16/007,778, entitled "TENANT BASED PERMISSION ALLOCATION FOR A GRAPH DATABASE," filed on Jun. 13, 2018, which will issue as U.S. Pat. No. 11,250,148 on Feb. 15, 2022, and which is hereby incorporated by reference in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called points, nodes, or vertices, which are connected by links, called lines or edges. The edges establish relationships (connections) between the nodes. Graphs can be directed or undirected. In an undirected graph, an edge from point A to point B is considered to be the same as a line from point B to point A. In a directed graph, the two directions are treated as distinct directed edges.

Although graph databases provide an efficient manner for storing an entity's data, difficulties often arise when data is shared between multiple tenants within an entity. For example, in an organization, a finance department (first tenant) may require a subset of data that is different than a subset of data required for a Human Resources department (second tenant). As a result, in current implementations, duplicates of any shared information between the departments may need to be created to ensure that each of the departments is only able to view data allocated to that department. Thus, the management of multiple graphs for each of the departments may be cumbersome and cause processing and storage inefficiencies, as data may be required to be duplicated for any tenant that requires a portion of the data.

OVERVIEW

Provided herein are enhancements for allocating permissions in a graph database. In one implementation, a method of managing a graph for access by a plurality of tenants includes identifying a request to classify a first subgraph in the graph for access by a tenant of the plurality of tenants, wherein the request indicates one or more vertex types and/or one or more edge types for the first subgraph. The method further includes identifying one or more vertices and/or one or more edges in the graph that qualify for the first subgraph based on the indicated one or more vertex types and/or one or more edge types, and allocating permissions to at least one user associated with the tenant to access the first subgraph.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Examples herein provide enhancements for the management of graphs in a computing environment. In particular, a graph database within a computing environment stores one or more graphs, wherein each of the graphs store data in the form of vertices and edges, where a vertex represents a data instance, and an edge represents a relationship of some type between any two vertices. Here, rather than maintaining different graphs for different tenants of a computing environment (or entity), wherein a tenant may comprise one or more users of an organization, tenants may share an overarching graph and be allocated portions of the graph or subgraphs in the graph. For example, a finance department of an organization may require different portions of a graph than the legal department of the same organization.

In allocating portions of a graph to different tenants, a superuser or administrator of the overarching graph may define vertex types and edge types that correspond to the particular tenant's subgraph. In particular, each edge and each vertex in the graph may be allocated at least one edge type or vertex type. For example, two vertex types may be "personnel names" and "building names," while an edge type may be "place of work" defining what building each personnel member works. As the edge types and the vertex types are defined for the graph, subgraphs may be allocated, wherein the subgraphs are each allocated a subset of the vertex types and/or edge types. Referring to the example above, a subgraph may only include the personnel names vertex type. Thus, any user allocated permissions to access the graph may only access vertices that correspond to the particular vertex type.

Once the subgraph is defined, the superuser or administrator for the overarching graph may allocate permissions for at least one user associated with a tenant to access the graph. In some implementations, in allocating permissions the user may be allocated one or more roles that permit the user to take various actions in interacting with the subgraph. These roles may include the ability to view the graph, add or remove vertices and/or edges in the graph, add or removed vertex types and/or edge types, generate a query, execute a query, add new users to access the graph, or some other similar role. Accordingly, while a first user may be able to add or remove vertices from a subgraph, another user may only be capable of viewing the subgraph. In this manner, there may be multiple layers of security for the graph, wherein users may be allocated to a tenant associated with a particular subgraph, and may further be allocated roles as part of the tenant limiting the operations for the particular subgraph.

Figure 1:
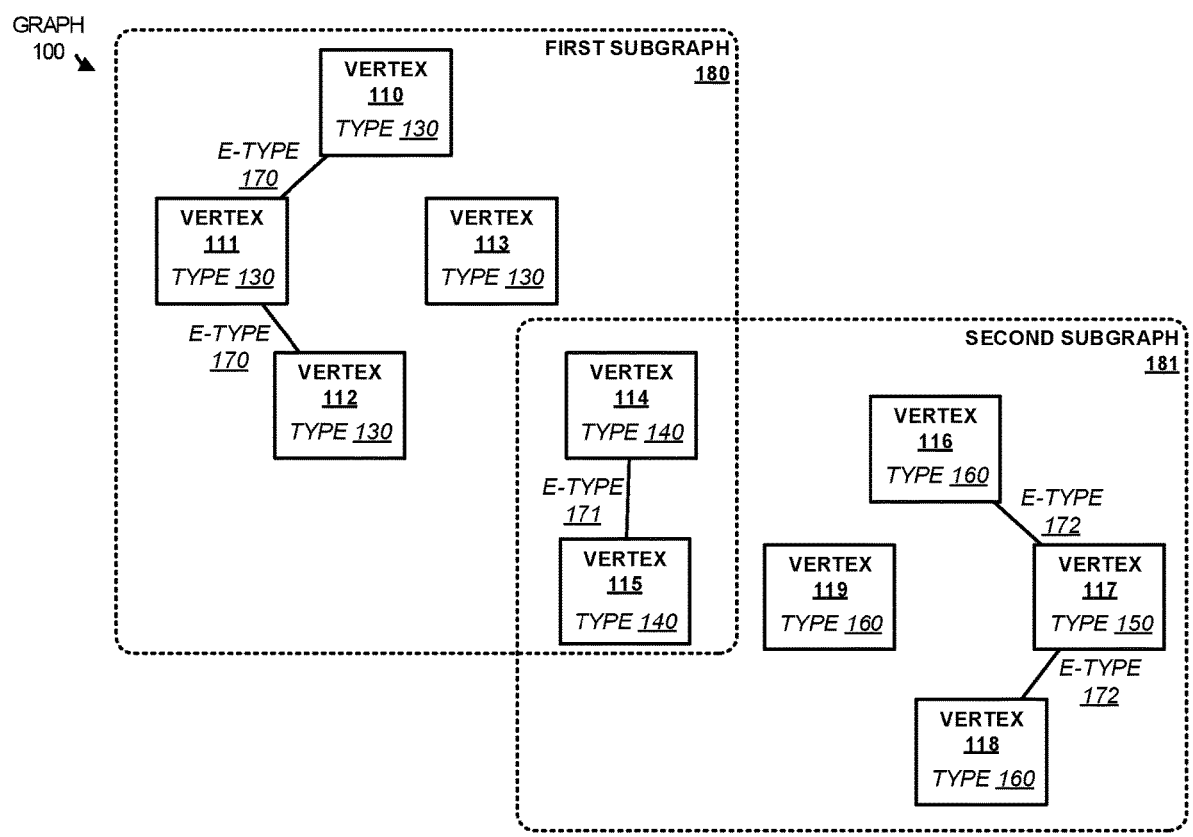
FIG. 1 illustrates a graph to be shared by multiple tenants according to an implementation.

FIG. 1 illustrates a graph 100 to be shared by multiple tenants according to an implementation. Graph 100 includes vertices 110-119, wherein vertices 110-111 are linked by an edge of edge type (E-type) 170, vertices 111-112 are linked by an edge of edge type 170, vertices 114-115 are linked by an edge of edge type 171, vertices 116-117 are linked by an edge of edge type 172, and vertices 117-118 are linked by an edge of edge type 172. Although demonstrated in the example of graph 100 using an undirected graph, it should be understood that similar operations may be applied to directed edges.

As depicted, graph 100 includes two subgraphs, first subgraph 180 and second subgraph 181. These subgraphs are used to represent portions of graph 100 that are allocated to different tenants, wherein a tenant may include one or more users. For example, an organization may employ a graph to manage information about the various employees, buildings, contractors, and the like. However, a finance department (consisting of one or more users) may require or be provided with different data than a Human Resources department (consisting of one or more additional users). Thus, any data in the graph that does not qualify for a particular tenant will not be made accessible or visible to the tenant when viewing their subgraph. Referring to the example of first subgraph 170. A user that corresponds to the tenant allocated to first subgraph 170 may view vertices 110-115 as well as edges of edge types 170-171. However, the user will not be able to view nor determine that vertices 116-119 exist within graph 100. Rather, graph 100 may appear to a user associated with first subgraph 180 as only include the vertices and edges that qualify for the subgraph.

In creating graph 100 to allocate permissions to various tenants, edge types and vertex types must be created for the classification of each of the edges and vertices. In particular, when graph 100 is created a "superuser" or administrator of the graph may generate first vertex types and edge types for vertices and edges to be added to the graph. Once the first vertex types and edge types are created, vertices and edges may be added to the graph, wherein each of the vertices and edges are associated with at least one edge type. Referring to vertex 110, when vertex 110 is added to graph 100 the vertex is allocated a vertex type of 130. This vertex type may then be used in determining which tenant of the entity may view or access that particular vertex. Similarly, when an edge is generated between vertex 110 and vertex 111, an edge type may be allocated to the edge to determine which of the tenants are able to view the edge.

Once the first vertex types and edge types are created by the administrator, the administrator may allocate the vertex types and edge types to be accessed by at least one user associated with the tenant. For example, a first tenant for an entity may require access to edges of edge types 130 and 140, and further require access to edge types 170. Consequently, the first tenant will be provided with permissions that permit at least one user associated with the tenant to view vertices within first subgraph 170. Additionally, it should be understood that vertices may be added and removed once a tenant is allocated permissions for particular vertex types and edge types. In particular, when an administrator initially generates graph 100 and allocates permissions for first subgraph 180, vertices 110-112 and 114-115 may be present in the graph. However, at some later time, the administrator and/or a user associated with the tenant for first subgraph 170 may add vertex 113. Once added, and because vertex 113 is only available to first subgraph 170, a user associated with first subgraph 170 may view the new vertex, wherein a user associated with second subgraph 171 may not view the new vertex.

In some implementations, for each of the tenants of graph 100, users may be provided with different roles for the tenant. These roles may include administrators that can view the subgraph, create and modify their subgraph, generate queries for the subgraph, or some other similar operation on the subgraph. Additionally, other users, delegated by the superuser for graph 100 or the administrator of the subgraph may perform a subset of the operations (or be allocated specific roles) of the administrator. For example, an administrator of first subgraph 180 may add a new user that has a role capable of viewing the subgraph and generating queries that can be performed on the subgraph. These queries may include reachability queries, distance queries, or some other type of query related to the vertices and edges of the graph.

Figure 2:
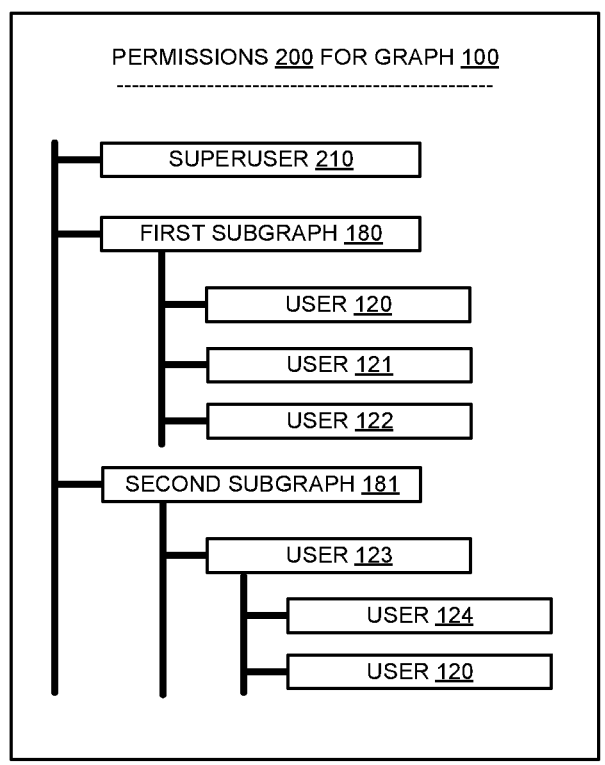
FIG. 2 illustrates a permissions hierarchy for a graph according to an implementation.

FIG. 2 illustrates a permissions 200 hierarchy for graph 100 according to an implementation. FIG. 2 includes superuser 210 capable of manipulating the entirety of graph 100, users 120-122 that are capable of accessing first subgraph 180, and users 123-124 and user 120 that are capable of accessing second subgraph 181.

As described previously in FIG. 1, when graph 100 is generated a superuser, such as superuser 210 may be responsible for allocating vertex types and edge types to various subgraphs and providing permissions to tenants to access the various subgraphs. Here, users 120-122 are a part of a first tenant and are capable of accessing edges and vertices that are identified as part of first subgraph 180. Once permissions are allocated to the users, the users may only identify the vertices and edges that correspond to their particular graph, while any edges and/or vertices that fall outside of the subgraph may not be viewable or identifiable by users 120-122.

In the present implementation, in addition to first subgraph 180, second subgraph 181 is also created that corresponds to a second tenant for graph 100. Here, user 123 is provided with permissions to view and access second subgraph 181. Further, users 124 and 120 are allocated permissions under that of user 123. In some implementations, user 123 may be considered an administrator of second subgraph 181 and allocate roles and permissions to other users based on the control. For example, user 123 may have the ability to view the subgraph, allocate permissions to other users to view the subgraph, generate queries for the graph, create and modify edges and vertices of the subgraph, generate vertex types and edge types for the subgraph, or some other similar operation associated with the graph. User 123 may then allocate other users with permissions to implement any subset of the aforementioned operations or perform the aforementioned roles for the graph. For example, user 123 may permit user 124 to generate queries for second subgraph 181, while user 120 may only be provided with permissions to view the graph and not provide any additional operations on the graph. Additionally, while the user may have particular permissions for a role in one subgraph, the user may have different permissions for a role on another subgraph. Thus, permissions 200 may be used to maintain a hierarchy for the roles provided by each user of users 120-124.

Figure 3:
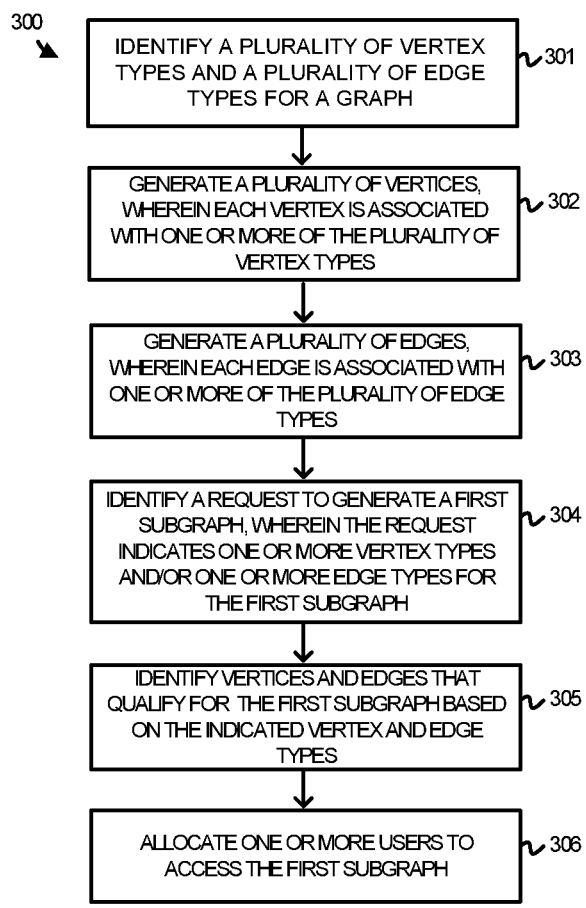
FIG. 3 illustrates an operation of a graph management system to allocate permissions of a graph according to an implementation.

FIG. 3 illustrates an operation 300 of a graph management system to allocate permissions of a graph according to an implementation. The processes of operation 300 are referenced parenthetically in the paragraphs that follow with reference to elements from FIGS. 1 and 2. Operation 300 may be implemented on one or more computing systems, such as server computing systems, desktop computing systems, or some other similar computing system.

As described herein, when a graph is generated, a superuser may be required to allocate permissions to various tenants associated with the graph. In particular, a graph management computing system may identify (301) a plurality of vertex types and a plurality of edge types for the graph, wherein vertex types may include names, locations, job type, or some other similar vertex type and wherein the edge types may define relationships between various edge types. For example, a first vertex may indicate an employee's name in an organization, while a second vertex may indicate a building for the organization. Thus, an edge type may be used to define which building the employee works in. In addition to defining the plurality of vertex types and edge types for the graph, operation 300 further generates (302) a plurality of vertices, wherein each vertex is associated with one or more of the plurality of vertex types, and further generates (303) a plurality of edges, wherein each edge is associated with one or more of the plurality of edge types. In some implementations, the vertices and edges may be manually entered by the superuser for the graph, however, it should be understood that the information may be derived at least partially from a relational database or some other similar data structure that maintains data for the vertices.

While the graph is generated with vertices and edges, operation 300 further identifies (304) a request to generate a first subgraph, wherein the request indicates one or more vertex types and/or one or more edge types for the first subgraph. For example, the superuser may identify a tenant that requires access to a portion of the overall graph. As a result, the administrator may define a subgraph using vertex types and edge types that should be allocated to the tenant. Referring to an example from graph 100 of FIG. 1, the superuser may identify that a tenant should have access to vertices of type 130 and type 140, and should further have access to edge types 170-171. Once the types are identified for the subgraph, operation 300 identifies (305) vertices and edges that qualify for the first subgraph based on the indicated vertex and edge types and classifies the vertices and edges as part of the subgraph. Thus, any edge and/or vertex that was classified as one of the requested vertex or edge types may be classified as part of the first subgraph, wherein classifying the vertices and edges as part of the subgraph permit a user for the first subgraph to access the required edges and vertices. Once the traits of the subgraph are identified (i.e., the vertex and edge types), operation 300 may allocate (306) permissions to one or more users associated with a tenant for the first subgraph. For example, a superuser may identify a subgraph to be allocated to a human resources department of the organization. As a result, once the subgraph is defined, the superuser may provide permissions to an administrator in the human resources department to access and manipulate the graph. In some examples, users of the graph management system may not initially be provided with permissions to access or view any portion of the graph. Instead, the users are required to obtain permissions for various subgraphs to access or view vertices and edges that correspond to those particular subgraphs.

In some implementations, each of the users that are allocated permissions for a particular subgraph may be granted different roles, permitting each of the user to perform different operations for the subgraph. For example, the superuser of a graph may provide an administrator with the ability to perform any operation on the subgraph associated with the administrator. However, other users that are part of the same tenant as the administrator may be provided with different roles that may limit and/or prevent particular operations with respect to the subgraph. In particular, a user may be prevented from adding or modifying any of the vertices or edges in the graph, while another user may be permitted to modify and/or create vertices and edges, but may be incapable of generating queries for the subgraph. These roles for the individual users may be allocated by the superuser for the graph or may be allocated by an administrator associated with the specific subgraph.

In some examples, the vertices and edges that are part of the subgraph may be dynamic as vertices and edges are added, removed, or modified. For example, although a first version of subgraph 180 may be provided to a tenant at a first instance, as changes are made to graph 100, the changes will also be reflected in first subgraph 180 so long as the changes apply to vertices and edges that qualify for the subgraph. These changes may be implemented by the superuser for graph 100, may be implemented by a user associated with the tenant for first subgraph 180, or may be implemented by a user associated with second subgraph 181, so long as the change corresponds to a vertex or edge that qualifies for both first subgraph 180 and second subgraph 181.

Figure 4:
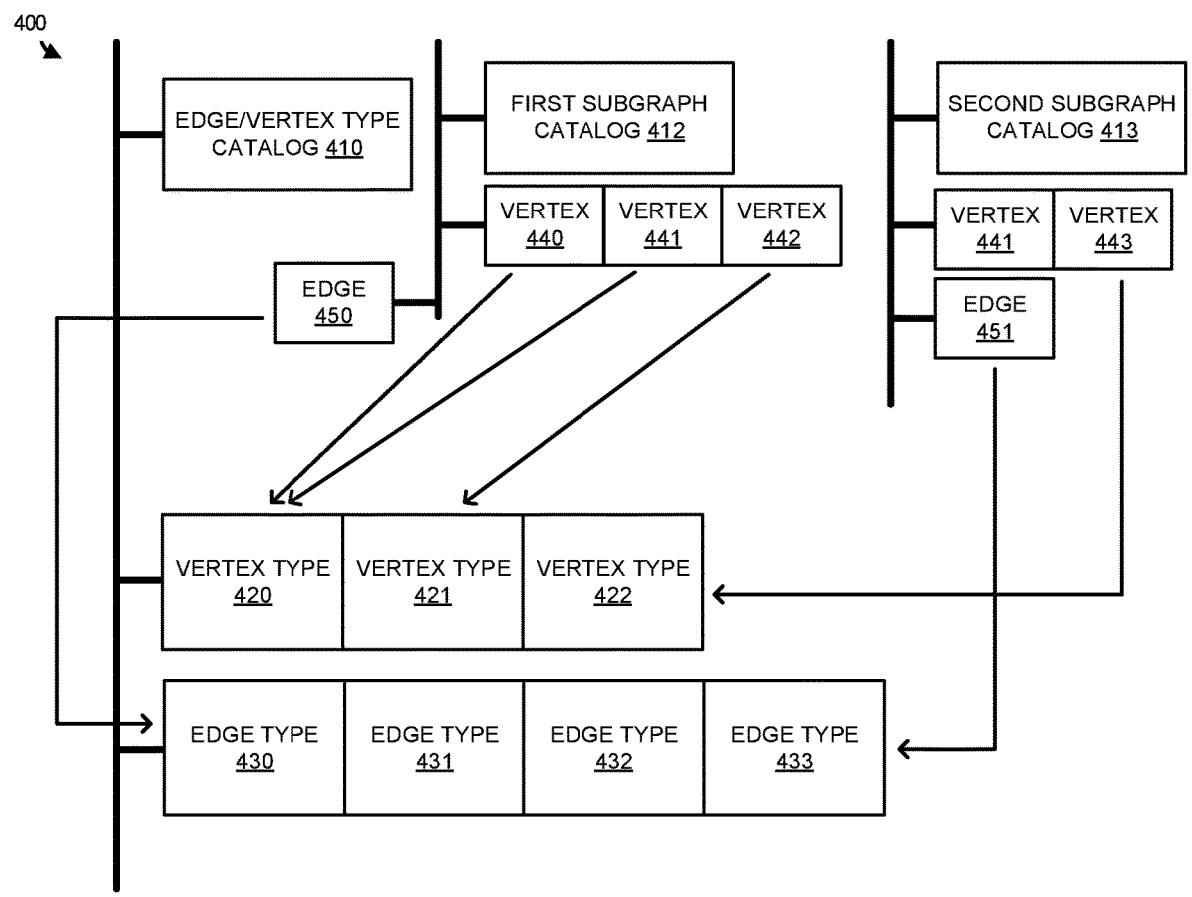
FIG. 4 illustrates an operational scenario of allocating vertices and edges to corresponding vertex and edge types according to an implementation.

FIG. 4 illustrates an operational scenario 400 of allocating vertices and edges to corresponding vertex and edge types according to an implementation. Operational scenario 400 includes edge/vertex type catalog 410, first subgraph catalog 412, and second subgraph catalog 413. Edge/vertex type catalog 410 includes vertex types 420-422 and edge types 430-433. First subgraph catalog 412 further includes vertices 440-442, and edge 450. Second subgraph catalog 413 further includes vertices 441 and 443, and edge 451.

As described herein, when a graph is generated vertex types and edge types are used to classify each of the vertices and edges that are implemented within the environment. Here, the graph includes vertex types 420-422 and edge types 430-433, wherein each subgraph is allocated a portion of the vertex types and/or edge types. Using the example of operational scenario 400 first subgraph catalog 412 includes vertices 440-442 that correspond to vertex types 420-421, while second subgraph catalog 413 corresponds to vertex types 420 and 422. Additionally, first subgraph catalog 412 includes edge 450 that corresponds to edge type 430, while second subgraph catalog 413 includes edge 451 that corresponds to edge type 433. By ensuring that each vertex and edge within a graph is allocated a particular vertex or edge type, the graph management system may ensure that only vertices and edges that are intended to be accessed by a particular tenant are available to that tenant. Thus, while the overarching graph may include additional vertex types, users associated with a particular tenant may not view vertices and edges outside of their defined types, and may further not know that the vertex or edge types exist.

Referring to the example in operational scenario 400, while the tenant associated with the first subgraph may view vertices of vertex types 420-421, the tenant associated with the second subgraph may only view vertices of vertex types 420 and 422. Thus, a user of the second subgraph may not know that vertex type 421 is implemented as part of the overarching graph, and may further be prevented access to any vertex that qualifies for vertex type 421. Similar operations may also be implemented for the edge types in limiting access to the individual edge types.

In some implementations, each vertex and edge of the graph may be stored with metadata, wherein the metadata may define the one or more edge or vertex types for the vertex or edge. Accordingly, based on the metadata, only vertices and edges that correspond to a particular subgraph will be identifiable and accessible to users for that subgraph.

Figure 5:
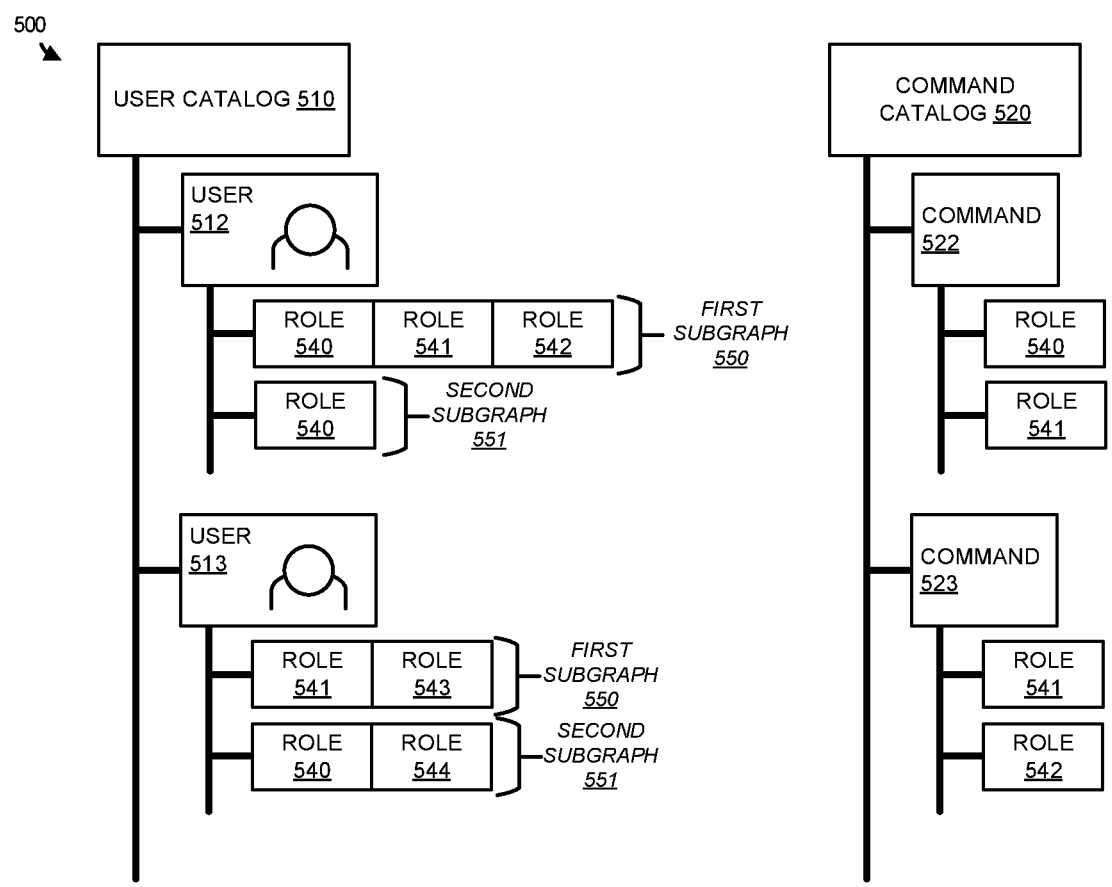
FIG. 5 illustrates an operational scenario of allocating roles to users in an entity according to an implementation.

FIG. 5 illustrates an operational scenario 500 of allocating roles to users in an entity according to an implementation. Operational scenario 500 includes user catalog 510 and command catalog 520. Operational scenario 500 is representative of data that might be stored by a graph management system to manage permissions for individual users of an entity.

In operation, as subgraphs are defined within an overarching graph, tenants may be allocated to each of the subgraphs, wherein the tenants may each comprise one or more users. For example, a human resources department may not require the same vertex types and edge types as the legal department. Accordingly, rather than providing a single view of a graph to each of the departments, subgraphs may be defined, which can then be provided to the relevant personnel for operations. In addition to defining tenants for each of the subgraphs, each of the individual user associated with a particular tenant may require different permissions or roles associated with a particular graph. These roles may include the ability to add, modify, or remove vertices and edges, the ability to add or remove vertex and edge types, the ability to view the graph, the ability to generate queries for the graph, the ability to assign new users roles for the graph, or some other similar role. Thus, in addition to being allocated to a particular graph, the users may also be provided with different roles for the subgraph that permit the user to make commands associated with the graph.

Referring to the example in operational scenario 500, users 512-513 are each able to have access to first subgraph 550 and second subgraph 551, but are each provided with different roles for the subgraphs. In particular, user 512 is allocated roles 540-542 for first subgraph 550 and role 540 for second subgraph 551. Additionally, user 513 is allocated roles 541 and 543 for first subgraph 550 and roles 540 and 544 for second subgraph 551. By assigning the user different roles, each of the users may provide different commands with respect to the subgraph. For example, if command 523 were associated with the ability to generate queries for a particular subgraph, then user 512 would be able to generate a query for first subgraph 550, but would be unable to generate a query for second subgraph 551.

In some implementations, once a user is allocated permissions or roles for a particular graph, the user may interact with the graph using the particular role. In particular, using a command interface, application, or some other similar interface, the user may provide a command, a subgraph associated with the command, and any other parameters required by the command. Once provided, the graph management system may determine whether the requesting user has access to the graph, and whether the user possesses the ability to use the command. Thus, if user 512 were to provide command 523 with an identifier for first subgraph 550, then the graph management system may permit the command to be implemented. In contrast, if user 512 provided command 523 with an identifier for second subgraph 551, then the command may be blocked as the user was not allocated the permissions or role for implementing the particular action.

Figure 6A:
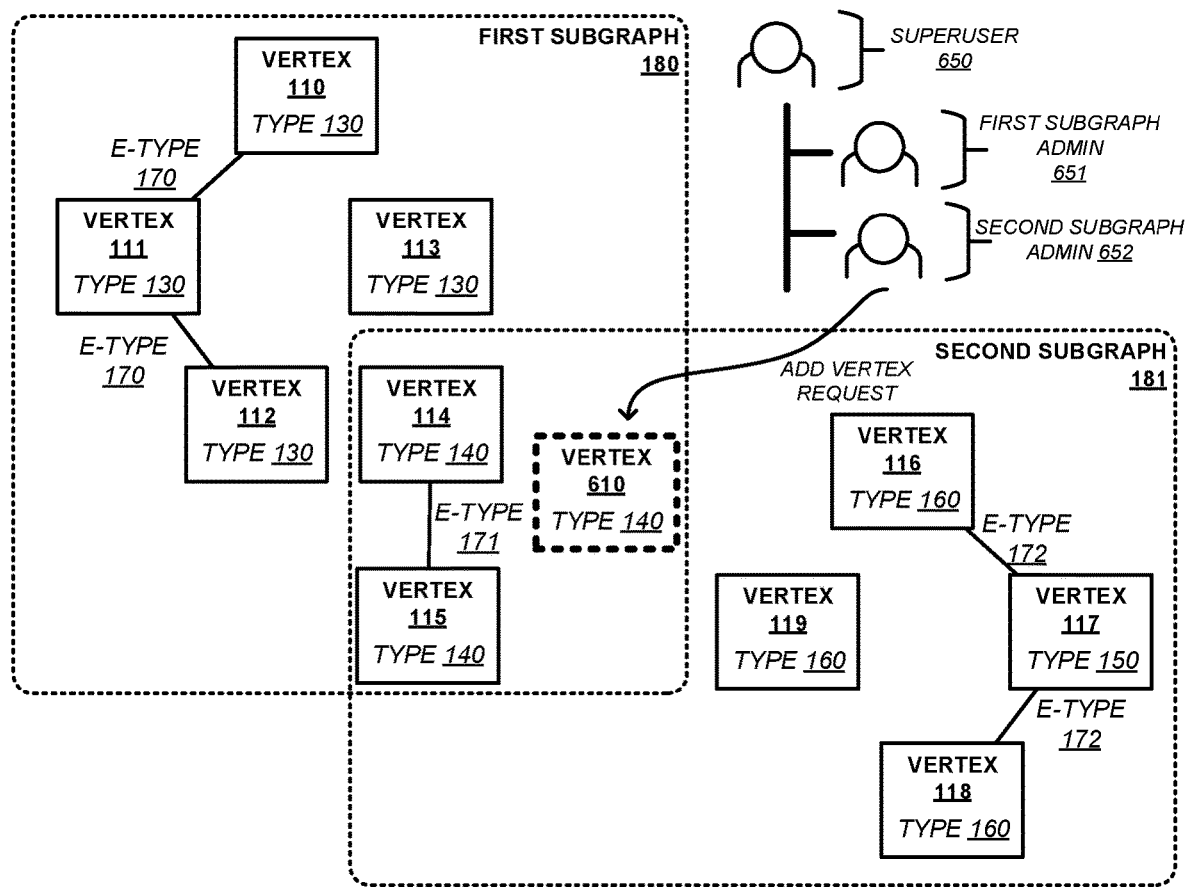
FIGS. 6A and 6B illustrate an operational scenario of adding vertices and edges to a graph according to an implementation.
Figure 6B:
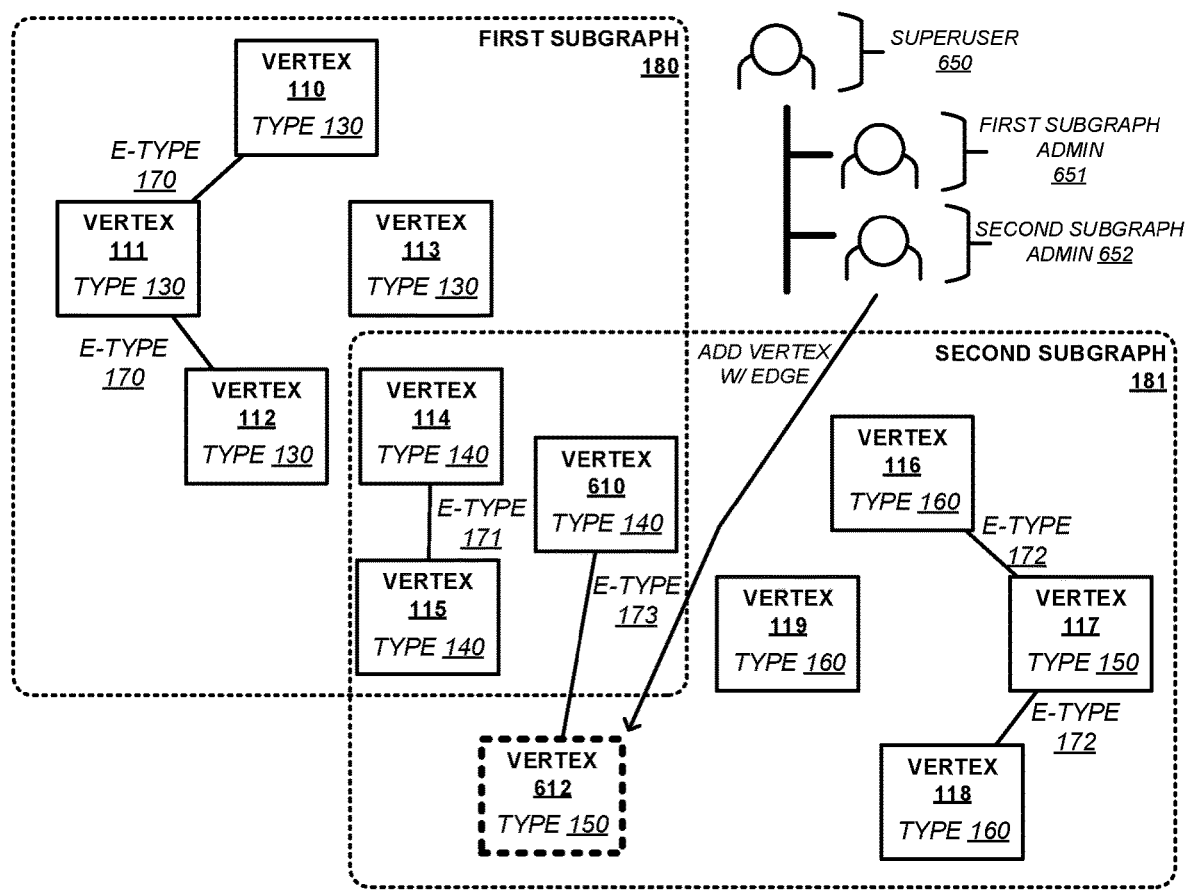

FIGS. 6A and 6B illustrate an operational scenario of adding vertices and edges to a graph according to an implementation. FIGS. 6A and 6B include systems and elements from graph 100 depicted in FIG. 1, and further include superuser 650, first subgraph administrator 651, and second subgraph administrator 652, wherein administrators 651-652 may be allocated permissions for their associated subgraph from superuser 650.

Referring first to FIG. 6A, in generating graph 100 of FIG. 1, various vertex types and edge types may be defined, such that when a vertex or edge is added to the graph, the vertex or edge is classified as at least one of the vertex or edge types. In addition to generating vertex and edge types, a superuser, such as superuser 650 may be responsible for defining subgraphs within the graph and allocating the subgraphs to various tenants. In particular, in generating a graph to be supplied to a tenant, superuser 650 may identify vertex and edge types that correspond to the particular subgraph. Once the types are identified, any edge and/or vertex that applies for the subgraph may be supplied to users associated with the particular tenant.

Here, superuser 650 allocates first subgraph 180 to a tenant associated with first subgraph administrator 651. This administrator may be provided with permissions (or roles) that define what commands are available to the particular administrator. In the present example, at least one role allocated to first subgraph administrator 651 and second subgraph administrator 652 permits the users to generate and add vertices to their corresponding subgraph. In particular, second subgraph administrator 652 provides a command to add vertex 610 of type 140 to the graph. This new vertex, which is of a type that is shared with first subgraph 180, is added to the graph and is made accessible to users in both second subgraph 181 and first subgraph 180.

Although demonstrated as adding a vertex that is shared between the first and second subgraphs, it should be understood that each of the administrators may add vertices and/or edges that only correspond to their subgraph. For example, second subgraph administrator 652 may add a vertex of type 160, which would not be identified or accessible to users associated with first subgraph 180. Additionally, in some implementations, the administrators for the individual subgraphs may be provided with a permission or role that permits the administrator to generate a new vertex or edge type. As an example, second subgraph administrator 652 may add a new vertex type, which would only be accessible to users associated with second subgraph 181.

Turning to FIG. 6B, which is representative of a time after the addition of vertex 610, second subgraph administrator 652 requests the addition of vertex 612 of type 150, and the addition of an edge of edge type 173. In response to the request, a new vertex is added to the graph that is only visible to users associated with second subgraph 181. In some implementations, second subgraph administrator 652 may be responsible for generating the vertex type that is limited to second subgraph 181, however, it should be understood that superuser 650 may be responsible for generating the vertex type. Additionally, an edge of edge type 173 is added to the graph, wherein edge type 173 is visible to users associated with second subgraph 181, while not being made identifiable or visible to users associated with first subgraph 180. Similar to the vertex, in some implementations, second subgraph administrator 652 may be responsible for generating the edge type for the connection between the vertices, however, it should be understood that the edge type may be allocated by the superuser in some implementations.

Figure 7:
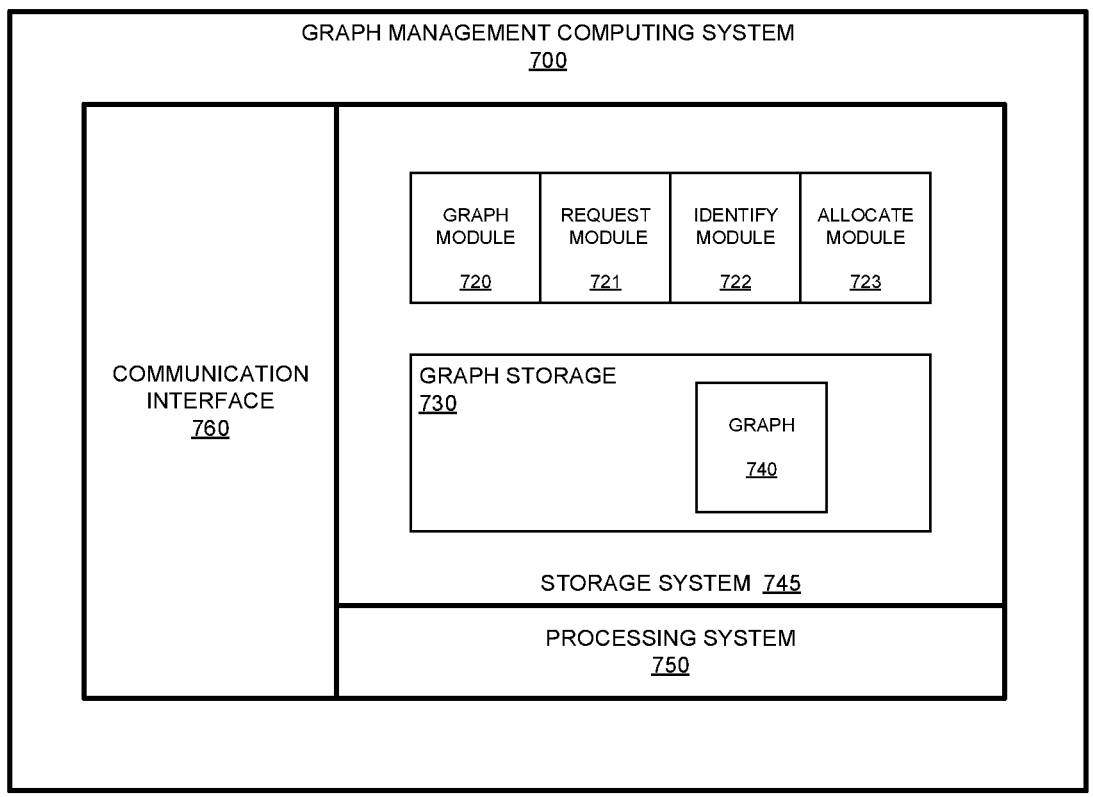
FIG. 7 illustrates a graph management computing system according to an implementation.

FIG. 7 illustrates a graph management computing system 700 according to an implementation. Graph management computing system 700 is representative of any computing system or systems with which the various operational architectures, processes, scenarios, and sequences disclosed herein for a graph management system can be implemented.

Graph management computing system 700 includes storage system 745, processing system 750, and communication interface 760. Processing system 750 is operatively linked to communication interface 760 and storage system 745. Communication interface 760 may be communicatively linked to storage system 745 in some implementations. Graph management computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with one or more end user computing systems in some implementations, wherein the communication interface may transfer and receive information related to graphs in graph storage 730.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device, but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises graph module 720, request module 721, identify module 722, and allocate module 723, wherein storage system 745 further includes graph storage 730 for graph 740. The operating software on storage system 745 may further include an operating system, utilities, drivers, network interfaces, applications, or some other type of software. When read and executed by processing system 750 the operating software on storage system 745 directs graph management computing system 700 to operate as described herein.

In one implementation, graph module 720 directs processing system 750 to identify vertex types and edge types for graph 740, and is further configured to add vertices and edges to the graph, wherein each of the vertices and edges are associated with at least one vertex of edge type. As vertices and edges are added to the graph, request module 721 directs processing system 750 to identify a request to classify a new subgraph in graph 740, wherein the request indicates edge and/or vertex types that qualify for the new subgraph. Once the request is identified, identify module 722 identifies vertices and/or edges that correspond to the requested vertex and/or edge types and classifies the vertices and/or edges as part of the requested subgraph. After the subgraph is created, allocate module 723 directs processing system 750 to allocate permissions to at least one user associated with the tenant to access the first subgraph.

In some implementations, in allocating permissions to a user associated with the tenant, one or more roles may be allocated to the at least one user by a superuser for graph 740. Each of roles may provide the user with the ability to view the subgraph, add or delete information within the graph, generate queries for the graph, execute queries on the graph, view the graph, or some other similar operation for the graph. For example, the superuser for graph 740 may initially provide a user associated with a tenant with administration permissions, wherein the user may be allocated all of the roles described above for the subgraph.

In some implementations, once an administrator of the subgraph is provided permissions for the subgraph, that administrator may also be provided with a role to add additional users to access the graph as part of the tenant. For example, an administrator of the subgraph may provide permissions to other users to view the graph, but not provide any operations on the vertices and edges therein. Similarly, the administrator may provide other users with roles to view the graph and perform operations to add, delete, or modify edges and vertices in the subgraph. Thus, as required by each of the tenants, users that are part of the tenant may be allocated roles to provide operations associated with the subgraph.

In some implementations, one or more users associated with a particular tenant and subgraph may be provided with the ability to add vertex and/or edge types to the subgraph. These new vertex types and edge types will not be accessible to other tenants (and corresponding users) that do not belong to the particular tenant. For example, a human resources department may share a vertex type (e.g. personnel names) with a legal department for an organization. If the human resources department added a new vertex type (e.g. salary) that can be linked via an edge to the shared vertex type, the legal department would be incapable of seeing the new vertex type and the edge connecting the vertex type. In this manner, each of the individual tenants may expand their own version of the subgraph with additional vertex and edge types, but such expansion will not have an effect on other tenants' subgraphs. However, if two tenants share an edge type, either tenant in some examples may be able to add edges to the shared edge type that would be visible to the other tenant. Similarly, any edges added by the superuser that correspond to the shared edge type will be made accessible or viewable to each of the tenants.

In some examples, after a first subgraph is defined within graph 740, a second subgraph within the first subgraph may be defined to further limit the accessibility of vertices to various tenants. For example, a superuser of graph 740 may define a first subgraph and provide permissions to an administrator for a tenant associated with the first subgraph. Once the permissions are provided, the administrator may define a second subgraph containing a subset of the edge types and vertex types of the first subgraph. Once the second subgraph is defined, the administrator of the first graph may allocate permissions to another user to access the second subgraph. In this manner, an overarching graph may be subdivided in various hierarchies, wherein the graph may be provided to a first tenant level with first subgraphs, and wherein the first tenants may further provide permissions to other tenants with other subgraphs within their associated subgraph.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing a graph for access by a plurality of tenants, the method comprising:
    identifying a request to generate a first subgraph in the graph for access by a tenant of the plurality of tenants, wherein the request indicates one or more vertex types of a plurality of vertex types in the graph to allocate to the tenant in the first subgraph and/or one or more edge types of a plurality of edge types in the graph to allocate to the tenant in the first subgraph, wherein the graph comprises a plurality of vertices and a plurality of edges;
    identifying one or more vertices and/or one or more edges in the graph that qualify as part of the first subgraph by identifying the plurality of vertices that have the indicated one or more vertex types and/or by identifying the plurality of edges that have the indicated one or more edge types;
    classifying the one or more vertices and/or one or more edges as part of the first subgraph; and
    allocating permissions to at least one user associated with the tenant to access the first subgraph, wherein the permissions make one or more commands available to one or more second users associated with the tenant to interact with the first subgraph.

2. The method of claim 1 further comprising:
    identifying the plurality of vertex types and the plurality of edge types for the graph;
    generating a plurality of vertices for the graph, wherein each vertex of the plurality of vertices is associated with at least one of the plurality of vertex types; and
    generating a plurality of edges for the graph, wherein each edge of the plurality of edges is associated with at least one of the plurality of edge types.

3. The method of claim 1 further comprising:
    identifying a second request to classify a second subgraph in the graph for access by a second tenant of the plurality of tenants, wherein the second request indicates one or more vertex types and/or one or more edge types for the second subgraph;
    identifying one or more vertices and/or one or more edges in the graph that qualify for the second subgraph based on the indicated one or more vertex types and/or one or more edge types for the second subgraph; and
    allocating permissions to at least one user associated with the second tenant to access the second subgraph.

4. The method of claim 3, wherein the first subgraph and the second subgraph share at least one vertex type and/or edge type.

5. The method of claim 3, wherein the first subgraph comprises at least one vertex type and/or edge type that is different than the second subgraph.

6. The method of claim 1, wherein allocating the permissions to the at least one user associated with the tenant to access the first subgraph comprises allocating one or more roles to the at least one user, wherein the one or more roles define available commands for the at least one user to interact with the first subgraph.

7. The method of claim 1 further comprising:
    identifying a request from the at least one user to allocate at least one role to a second user of the one or more second users associated with the tenant to access the first subgraph; and
    in response to the request from the at least one user, allocating the at least one role to the second user for the first subgraph, wherein the at least one role permits the second user to generate and execute queries on the first subgraph.

8. The method of claim 1, wherein allocating the permissions to the at least one user associated with the tenant to access the first subgraph comprises allocating at least view permissions to the at least one user to view the first subgraph.

9. A computing system comprising:
    one or more non-transitory computer readable storage media; and
    program instructions, for managing a graph for access by a plurality of tenants, stored on the one or more non-transitory computer readable storage media that, when read and executed by a processing system, direct the processing system to at least:
        identify a request to generate a first subgraph in a graph for access by a tenant of the plurality of tenants, wherein the request indicates one or more vertex types of a plurality of vertex types in the graph to allocate to the tenant in the first subgraph and/or one or more edge types of a plurality of edge types in the graph to allocate to the tenant in the first subgraph, wherein the graph comprises a plurality of vertices and a plurality of edges;
        identify one or more vertices and/or one or more edges in the graph to classify as part of the first subgraph by identifying the plurality of vertices that have the indicated one or more vertex types and/or by identifying the plurality of edges that have the one or more edge types;
        classify the one or more vertices and/or one or more edges as part of the first subgraph; and
        allocate permissions to at least one user associated with the tenant to access the first subgraph, wherein the permissions make one or more commands available to one or more second users associated with the tenant to interact with the first subgraph.

10. The computing system of claim 9, wherein the program instructions further direct the processing system to:
    identify the plurality of vertex types and the plurality of edge types for the graph;
    generate a plurality of vertices for the graph, wherein each vertex of the plurality of vertices is associated with at least one of the plurality of vertex types; and
    generate a plurality of edges for the graph, wherein each edge of the plurality of edges is associated with at least one of the plurality of edge types.

11. The computing system of claim 9, wherein the program instructions further direct the processing system to:
    identify a second request to classify a second subgraph in the graph for access by a second tenant of the plurality of tenants, wherein the second request indicates one or more vertex types and/or one or more edge types for the second subgraph;

identify one or more vertices and/or one or more edges in the graph that qualify for the second subgraph based on the indicated one or more vertex types and/or one or more edge types for the second subgraph; and allocate permissions to at least one user associated with the second tenant to access the second subgraph.

12. The computing system of claim 9 further comprising the processing system.

13. A system comprising:

a graph storage system configured to store a graph, wherein the graph comprises a plurality of vertices each assigned at least one vertex type of a plurality of vertex types and a plurality of edges each assigned at least one edge type of a plurality of edge types;

a processing system configured to:

identify a request to generate a first subgraph in a graph for access by a tenant of a plurality of tenants, wherein the request indicates one or more vertex types of the plurality of vertex types to allocate to the tenant in the first subgraph and/or one or more edge types of the plurality of edge types to allocate to the tenant in the first subgraph;

identify one or more vertices and/or one or more edges in the graph to classify as part of the first subgraph based on the indicated one or more vertex types and/or one or more edge types; and allocate permissions to at least one user associated with the tenant to access the first subgraph, wherein the permissions make one or more commands available to one or more second users associated with the tenant to interact with the first subgraph.

14. The system of claim 13, wherein the processing system is further configured to:

identify the plurality of vertex types and the plurality of edge types for the graph;

generate a plurality of vertices for the graph, wherein each vertex of the plurality of vertices is associated with at least one of the plurality of vertex types; and generate a plurality of edges for the graph, wherein each edge of the plurality of edges is associated with at least one of the plurality of edge types.

15. The system of claim 13, wherein allocating the permissions to the at least one user associated with the tenant to access the first subgraph comprises allocating one or more roles to the at least one user, wherein the one or more roles define available commands for the at least one user to interact with the first subgraph.

16. The system of claim 15, wherein a role of the one or more roles permits the at least one user to generate and execute queries on the first subgraph.

17. The computing system of claim 9, wherein allocating the permissions to the at least one user associated with the tenant to access the first subgraph comprises allocating one or more roles to the at least one user, wherein the one or more roles define available commands for the at least one user to interact with the first subgraph.

18. The computing system of claim 9, wherein the program instructions further direct the processing system to:

identify a request from the at least one user to allocate at least one role to a second user of the one or more second users associated with the tenant to access the first subgraph; and in response to the request from the at least one user, allocate the at least one role to the second user for the first subgraph, wherein the at least one role permits the second user to generate and execute queries on the first subgraph.

19. The computing system of claim 9, wherein allocating the permissions to the at least one user associated with the tenant to access the first subgraph comprises allocating at least view permissions to the at least one user to view the first subgraph.

20. The system of claim 13, wherein allocating the permissions to the at least one user associated with the tenant to access the first subgraph comprises allocating at least view permissions to the at least one user to view the first subgraph.

* * * * *